United States Patent
Su et al.

(10) Patent No.: US 10,779,336 B2
(45) Date of Patent: Sep. 15, 2020

(54) METHOD AND DEVICE FOR ESTABLISHING WIRELESS CONNECTION THROUGH FIRST APPLICATION ON USER EQUIPMENT

(71) Applicant: Shanghai Zhangxian Network Technology Co., Ltd., Shanghai (CN)

(72) Inventors: Yong Su, Shanghai (CN); Jian Yang, Shanghai (CN)

(73) Assignee: SHANGHAI ZHANGXIAN NETWORK TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/243,108

(22) Filed: Jan. 9, 2019

(65) Prior Publication Data

US 2019/0150206 A1    May 16, 2019

Related U.S. Application Data

(63) Continuation of application No. PCT/CN2016/113621, filed on Dec. 30, 2016.

(30) Foreign Application Priority Data

Jul. 11, 2016    (CN) .......................... 2016 1 0542530

(51) Int. Cl.
*H04W 76/10* (2018.01)
*H04W 52/02* (2009.01)
(Continued)

(52) U.S. Cl.
CPC .......... *H04W 76/10* (2018.02); *G06F 21/606* (2013.01); *G06F 2221/2111* (2013.01);
(Continued)

(58) Field of Classification Search
CPC ..... H04W 76/10; H04W 12/02; H04W 80/10; H04W 88/02; H04W 48/20; H04W 48/02; G06F 21/606; G06F 2221/2111
See application file for complete search history.

(56) References Cited

U.S. PATENT DOCUMENTS

| 2009/0147700 A1* | 6/2009 | Sewall | ................ H04L 41/0816 370/254 |
| 2011/0035500 A1* | 2/2011 | Yang | ..................... G06F 3/0486 709/227 |

(Continued)

FOREIGN PATENT DOCUMENTS

| CN | 1468398 A | 1/2004 |
| CN | 101207924 A | 6/2008 |

(Continued)

*Primary Examiner* — Kiet Tang
(74) *Attorney, Agent, or Firm* — Bayramoglu Law Offices LLC (57) ABSTRACT

The present application is to provide a method and a device for establishing wireless connection through a first application on user equipment. The present application is based on the connection request sent by the second application that works in the same user equipment as the first application, establishes the wireless connection between the user equipment and the target wireless access point according to the access information of the target wireless access point corresponding to the connection request through the first application. Herein, executive codes corresponding to the connection operations are not needed to be embedded and executed in the second application, thereby security risks to the second application brought by executing unknown codes of other applications in the second application can be avoided. Meanwhile, risks of information leakage are avoided.

20 Claims, 3 Drawing Sheets

(51) Int. Cl.
*G06F 3/0486* (2013.01)
*H04W 76/14* (2018.01)
*H04L 12/24* (2006.01)
*G06F 21/60* (2013.01)
*H04W 80/10* (2009.01)
*H04W 88/02* (2009.01)
*H04W 12/02* (2009.01)

(52) U.S. Cl.
CPC ............ *H04W 12/02* (2013.01); *H04W 80/10* (2013.01); *H04W 88/02* (2013.01)

(56) References Cited

U.S. PATENT DOCUMENTS

| | | | |
|---|---|---|---|
| 2013/0331141 | A1 | 12/2013 | Montemurro |
| 2014/0140288 | A1* | 5/2014 | Jung .................... H04W 76/14 370/329 |
| 2015/0113432 | A1 | 4/2015 | Jung et al. |
| 2015/0237197 | A1* | 8/2015 | Kuehnel ........... H04W 52/0274 370/311 |

FOREIGN PATENT DOCUMENTS

| | | |
|---|---|---|
| CN | 101702815 A | 5/2010 |
| CN | 103889034 A | 6/2014 |
| CN | 104243464 A | 12/2014 |
| CN | 105682015 A | 6/2016 |

\* cited by examiner

METHOD AND DEVICE FOR ESTABLISHING WIRELESS CONNECTION THROUGH FIRST APPLICATION ON USER EQUIPMENT

CROSS REFERENCE TO RELATED APPLICATIONS

This application is a continuation application of the International Application No. PCT/CN2016/113621, filed on Dec. 30, 2016, which is based upon and claims priority to Chinese Patent Application No. 201610542530.5, filed on Jul. 11, 2016, the entire contents of which are incorporated herein by reference.

TECHNICAL FIELD

The present invention relates to the field of computers, particularly relates to the technology of establishing wireless connection through first application on user equipment.

BACKGROUND

In the existing technology, if an application needs the implementation of invoking a service of another application, for example, if a third-party application in a user equipment needs implementation of invoking a wireless connection service of certain wireless connection application, generally the wireless connection application provides the SDK (Software Development Kit) corresponding to the wireless connection service to the third-party application, and then, the third-party application implements the wireless connection service by executing the codes of the SDK inside the third-party application. At this point, for the third-party application, there are security risks that unknown codes of another application executed within the third-party application. For the wireless connection application, there is a risk of leakage of data information of the wireless connection application, in case that access information of a wireless access point involved in the wireless connection service mentioned above is provided directly to the third-party application.

SUMMARY

The purpose of the present application is to provide a method and a device for establishing wireless connection through a first application on user equipment.

According to an aspect of the present application, a method for establishing wireless connection through a first application on user equipment is provided. The method includes:

acquiring connection request sent by a second application working in the same user equipment as the first application;

establishing wireless connection between the user equipment and the target wireless access point according to the access information of the target wireless access point corresponding to the connection request by the first application.

According to another aspect of the present application, a device for establishing wireless connection through the first application on the user equipment is also provided. The device includes:

a first apparatus, configured to acquire connection requests sent by the second application working in the same user equipment as the first application;

a second apparatus, configured to establish wireless connection between the user equipment and the target wireless access point according to the access information of the target wireless access point corresponding to the connection request by the first application.

Compared with the existing technology, the device of the present invention is based on the connection requests sent by the second application that works in the same user equipment as the first application. According to the access information of the target wireless access point, the device establishes wireless connection between the user equipment and the target wireless access point by the first application, the target wireless access point corresponds to the connection requests sent by the second application. Herein, for the second application with connectivity requirements, as long as the connection requests corresponding to the connection are sent, the first application corresponding to the second application can effectively respond and perform the wireless connection between the user equipment and the corresponding target wireless access point, thus the corresponding user of the second application will quickly realize the implementation of the connection service. Based on the present application, the second application can realize requirement of connection requests through the connection operations of the first application, and there is no need to embed and execute the executive codes corresponding to the connection operations in the second application, thereby security risks due to executing unknown codes of other applications in the second application can be avoided. Meanwhile, risks of information leakage are avoided which are caused by directly providing codes of the first application itself or other data information, such as the access information needed by establishing wireless connection, to the second application. In addition, based on the present application, the second application establishes the wireless connection through the first application, compared with traditional technology of invoking the wireless connection service by the first application directly through the system application of the equipment, the selection range of the available target wireless access points acquired by the second application through the first application is broader than that of invoking the wireless connection service by the first application directly through the system application of the device, and the stability of the wireless connection is better.

Further, in a preferred embodiment of the present application, the device is also able to response a search request regarding the wireless access point sent by the second application through the first application, require one or more candidate wireless access points corresponding to the search request through the first application, and provide the one or more candidate wireless access points to the second application. On this basis, further, in another preferred embodiment of the present application, after the one or more candidate wireless access points are provided to the second application by means of the first application, and the connection requests with respect to the target wireless access points in the one more candidate wireless access points from the second application are acquired by the first application, and then, the wireless connection between the user equipment and the target wireless access point is established based on the access information. Herein, in the present application, different requests from the second application are responded distinctively by the first application based on specific requirements of the connection service provided by the second application for the first application in practical use. Meanwhile, the result of invoking execution corresponding to the requests is also sent back to the second application. In the above listed embodiments, no matter the search request of the wireless access point of the second application, or the connection requirement of the wireless access point, or the connection service requirement of other types, are all executed specifically through the first application corresponding to the second application, and executive codes corresponding to the connection operations are not needed to be embedded and executed in the second application, thereby security risks to the second application due to executing unknown codes of other applications are avoided; also, risks of information leakage are avoided which are caused by directly providing codes of the first application itself or other data information, such as the access information needed by establishing wireless connection, to the second application; meanwhile, the experience optimization of users corresponding to the second application to the related service of wireless connection is also taken into account.

BRIEF DESCRIPTION OF THE DRAWINGS

Through reading the detailed description to the non-limited embodiment with reference to the following drawings, other features, objectives, and advantages of the present application will become more clear.

Identical or similar reference numbers of drawings represent same or similar components in the drawings.

DETAILED DESCRIPTION OF THE EMBODIMENTS

The present invention is further described in detail in combination with the drawings.

In a representative configuration of the present application, equipment of service network and trustees respectively include one or more central processing units (CPU), input/output interfaces, network interfaces and memories.

Memories may include non-permanent memories in a computer readable media, random access memories (RAM) and/or non-volatile memories such as read-only memories (ROM) or flash RAM. Memories are the example of a computer readable medium.

Computer readable media, including permanent and non-permanent media, removable and non-removable media, are able to realize information storage by any method or technology. The information can be computer readable instructions, data structures, modules of programs, or other data. An example of computer storage media includes, but is not limited to, phase-change random access memory (PRAM), static random access memory (SRAM), dynamic random access memory (DRAM), other types of random access memory (RAM), read only memory. (ROM), electrically erasable programmable read only memory (EEPROM), flash memory or other memory technology, compact disk read only memory (CD-ROM), digital versatile disk (DVD) or other optical storage, a magnetic tape cartridge, magnetic tape storage or other magnetic storage device or any other non-transportable medium, which can be used to store information that can be accessed by a computing device. As defined herein, computer readable media does not include non-transitory computer readable media, such as modulated data signals and carrier waves.

Figure 1:
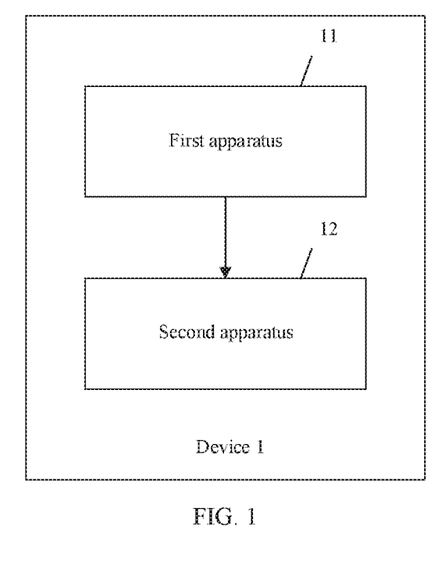
FIG. 1 shows a schematic diagram of a device for establishing wireless connection through a first application on user equipment according to an aspect of the present application.

FIG. 1 shows a schematic diagram of device 1 for establishing wireless connection through a first application on user equipment according to an aspect of the present application. Herein, the device 1 includes first apparatus 11 and second apparatus 12.

Wherein, the first apparatus 11 acquires a connection request sent by the second application that works in the same user equipment as the first application; the second apparatus 12 establishes a wireless connection between the user equipment and the target wireless access point according to access information of the target wireless access point corresponding to the connection request by the first application.

Herein, the user equipment includes but is not limited to kinds of smart terminals, such as personal computers, smart mobile devices, etc. In the present application, the device 1 may include the user equipment; or, the device 1 is the user equipment; or, the device 1 belongs to the user equipment. Herein, preferably, in the corresponding embodiment, the device 1 corresponds to the user equipment. At this point, for the convenience of description, the device 1 and the user equipment can be used interchangeably. Herein, the establishment of the wireless connection may preferably be a wireless network accessed corresponding to the wireless access point by the user equipment, i.e. the wireless hotspot. The wireless network includes but is not limited to a wireless local network based on the IEEE 802.11 series standard protocols, for example, a wireless local network based on the protocol IEEE 802.11b, namely, the so-called WiFi network.

Specifically, the first apparatus 11 acquires the connection request sent by the second application that works in the same user equipment as the first application. Preferably, the user equipment loads and runs the first application and the second application simultaneously. Herein, the first application includes applications that provide a wireless connection service, for example, an application developed by the WiFi service provider; the second application is the application that invokes the wireless connection service, which can be a system application corresponding to the user equipment, or any other third-party application that requires invoking the wireless connection service. Taking user equipment as a smart mobile device as an example, the third-party application may include but is not limited to kinds of native applications, or web applications. At this point, the connection request sent by the second application is acquired by the user equipment, preferably, by the first application in the user equipment. Herein, the connection request may be based on a networking request sent by a user corresponding to the second application, for example, the user clicks a button corresponding to establishment of the wireless connection on the user interface of the second application, and then the connection request is launched by the second application; the connection request may also be the wireless network connection request launched spontaneously by the second application based on other preset triggering conditions. Herein, the connection request may be realized based on a communication mode agreed by the first application and the second application, for example, the connection request is sent to the first application by the second application based on inter-process communication mode.

Then, the second apparatus 12 establishes wireless connection between the user equipment and the target wireless access point according to the access information of the target wireless access point corresponding to the connection request through the first application. Herein, the connection request may be a connection request that contains the determined target wireless access point, or a connection request that does not contain the determined target wireless access point. Herein, an alternative scenario is: if in the user equipment, such as the first application in the user device, the access information of one or more wireless access points corresponding to the connection request is pre-stored or pre-recorded, then when the connection request contains the determined target wireless access point, the access information of the target wireless access point is directly determined, and then the corresponding wireless connection is established; or, when the connection request does not contain the determined target wireless access point, target wireless access point in one or more wireless access points is determined by the first application, and according to the access information of the target wireless access point by the first application, the wireless connection between the user equipment and the target wireless access point is established. In addition, another alternative scenario is: if in the user equipment, the access information of one or more wireless access points corresponding to the connection request is not pre-stored or pre-recorded, then based on the access information of the target wireless access point corresponding to the connection request acquired from a network device corresponding to the user equipment, the first application establishes the wireless connection between the user equipment and the target wireless access point.

Herein, the network device includes but is not limited to a computer, a network host, a single network server, multiple network server sets, or a cloud composed of multiple servers. Preferably, the network device stores mass wireless access points and related information of the wireless access points, wherein, the related information of the wireless access points includes but is not limited to the access information of the wireless access points, information of signal strength, information of security level, information of names, information of geographical locations, etc.

In the present application, according to the access information of the target wireless access point corresponding to the connection request, the device 1 establishes the wireless connection between the user equipment and the target wireless access point by the first application based on the connection request sent by the second application, the second application works in the same user equipment as the first application. Herein, for the second application with connectivity requirements, the second application only needs to send the corresponding connection request, the wireless connection between the user equipment and the target wireless access point can be effectively responded and executed completely by the first application corresponding to the second application, thus the corresponding user of the second application will quickly realize the implementation of the connection service. Based on the present application, the second application can realize requirement of connection through connection operations of the first application, and executive codes corresponding to the connection operations are not needed to be embedded and executed in the second application, thereby security risks to the second application due to executing unknown codes of other applications in the second application are avoided; meanwhile, risk of information leakage is avoided by directly providing codes of the first application itself or other data information, such as the access information needed by establishing wireless connection, to the second application. In addition, based on the present application, the second application establishes the wireless connection through the first application, compared with the traditional technology of invoking the wireless connection service by the first application directly through the system application of the device 1, the selection range of the wireless access points of the available target acquired by the second application through the first application is broader than that of invoking the wireless connection service by the first application directly through the system application of the device 1, and the stability of the wireless connection is better.

In a preferred embodiment, the second apparatus 12 includes a first unit (not shown) and a second unit (not shown).

Wherein, the first unit acquires the access information of one or more wireless access points corresponding to the connection request from a corresponding network device through the first application; according to the access information, the second unit establishes wireless connection between the user equipment and the target wireless access point of the one or more wireless access points through the first application. At this point, the access information acquired from the corresponding network device by the first application may be assumed to be existing in the cases listed below: in the user equipment, the access information of one or more wireless access points corresponding to the connection request is not pre-stored or pre-recorded; or in the user equipment, the accuracy of the access information pre-stored or pre-recorded of the wireless access point is lower, or satisfying the preset conditions of updating the access information.

Herein, preferably, the first unit includes a first subunit (not shown), a second subunit (not shown) and a third subunit (not shown). Wherein, based on the connection request, the first subunit acquires one or more scanning wireless access points around the user equipment by the first application through wireless scanning. Then, an information acquirement request is sent to the corresponding network device through the first application by the second subunit, wherein, at least one of the one or more scanning wireless access points is included in the information acquirement request, herein, at least one of the one or more scanning wireless access points is included in the information acquirement request which may be based on preset number or conditions of the scanning wireless access points. Then, the access information of the one or more scanning wireless access points returned by the network device is acquired by the third subunit, wherein, the wireless access point is included in the one or more scanning wireless access points, herein, preferably, based on the wireless access points stored by the network device and the corresponding related information of the wireless access points, the scanning wireless access points which have the corresponding access information in the network device are determined by the network device, and then the access information of the scanning wireless access point is returned to the user equipment; or, further, preferably, in the scanning wireless access points which have the corresponding access information in the network device, based on preset filtering conditions, such as condition of signal strength of the wireless access point and condition of security level, etc., one or more wireless access points which fit the conditions are preferably selected, and the corresponding access information is provided to the user equipment. Then, according to the access information, the second unit establishes wireless connection between the user equipment and the target wireless access point of the one or more wireless access points through the first application. At this point, if there are many wireless access points returned by the access information, then randomly or preferably a wireless access point may be selected to be the target wireless access point.

In a preferred embodiment, the connection request sent by the second application that works in the same user equipment as the first application is required by the first apparatus 11, wherein, connection request includes information of application recognition of the first application, information of the connection service recognition and a service invoking name.

Specifically, in the present application, the first application may communicate with the second application based on agreed way, for example, communication is realized through inter-process communication mode between the first application and the second application. Taking the inter-process communication as the example, communication parameters corresponding to the connection request are pre-defined and agreed b r the first application and the second application, herein, communication parameters preferably include the information of application identification, the information of the connection service identification and the service invocation name of the first application. The information of application identification may be a name of an application package of the first application, or other identification information, such as "com.abcd.wifilocating"; the information of the connection service identification is used to represent information of a specific service invoked through the first application which is required by the second application, such as parameters like "connect, auto connect" that represent connecting the wireless access point to the service; the service invocation name corresponds to the agreed inter-process communication mode. Taking the inter-process communication as an example, the service invocation name may include "wifi.intent.action.CALL". Then, information of application identification, information of the connection service identification and a service invoking name of the first application are added to the connection request sent by the second application.

On this basis, preferably, at least any one of following parameters are included in the connection request: a wireless router name, such as SSID (Service Set Identifier) information of the wireless access point corresponding to the wireless router; a MAC (Media Access Control) address of the wireless router, such as BSSID (Basic Service Set identifier) information of the wireless access point corresponding to the wireless router; an encryption type of the wireless router, for example, security Level type may be OPEN, WEP or WPA; signal strength of the wireless router, such as RSSI (Received Signal Strength Indication) information. A preferred scenario is that, the connection request may be a connection request which includes the determined target wireless access point, wherein, the connection request may include information of the wireless router name, the MAC address of the wireless router, the encryption type of the wireless router or the signal strength of the wireless router and the like. Herein, the person with ordinary skill in the art should be able to understand that, the parameters above are merely examples, other parameters that currently exist or come up in future suitable for the present application should be included within the protection scope of the present application, and should be incorporated herein in the protection scope by reference.

Preferably, application-related information of the second application is also included in the connection request; wherein, according to the access information of the corresponding target wireless access point, the second apparatus 12 establishes the wireless connection between the user equipment and the target wireless access point through the first application, wherein, the target wireless access point and application-related information of the second application are matched.

Specifically, in practical use, an optimization scenario of establishing wireless connection is based on application characteristics and application requirements of each second application, the target wireless access point with relatively high matching degree is connected to the second application. Based on the scenario, the matching requirement of the connection request of the second application may be included or reflected by the application-related information. For example, the application-related information may be application type information of the second application, or may be communication requirement information of the second application. Further, the target wireless access point and the application-related information are matched. For example, if the second application is an application of the type of payment, then high security level is required by the corresponding target wireless access point; and for another example, if the second application is an application of the type of video, then high signal strength is required by the corresponding target wireless access point. Herein, the person with ordinary skill in the art should be able to understand that the application-related information above is merely an example, other application-related information that currently exists or comes up in future suitable for the present application should be included within the protection scope of the present application, and should be incorporated herein in the protection scope by reference.

Preferably, the connection request based on the inter-process communication mode is sent to the first application by the second application. Herein, in the present application, the first application may communicate with the second application based on agreed way. The agreed way may be preferably the inter-process communication mode. Herein, the interface corresponding to the connection service may be provided to the second user by the first application, and the second user uses standard inter-process communication means to add parameters agreed by the first application and the second application to the connection request.

Specifically, herein, a preferred scenario is, the connection request includes the connection request with the determined target wireless access point, at this point, the connection request includes information of application identification of the first application such as "com.abcd.wifilocating"; information of the connection service identification such as "connect"; and service invoking name such as "wifi.intent.action.CALL"; the connection request also includes information of the wireless router corresponding to the target access point, namely, parameters respectively corresponding to a wireless router name, a MAC address of the wireless router, an encryption type of the wireless router or signal strength of the wireless router, for example: {"bssid":"c0:3d:46:00:71:8e","ssid":"TPLINK-718Dq", "securityLevel":"2","rssi":"−47"}.

Herein, in another preferred scenario, the connection request does not include the connection request of the corresponding target wireless access point, but relies on selecting the target wireless access point for the second application by the first application. At this point, the connection request includes information of application identification of the first application such as "com.abcd.wifilocating"; information of the connection service identification, such as "autoconnect" that represents connecting a best WiFi by searching automatically; and a service invocation name "wifi.intent.action.CALL". The connection request also includes information of the wireless router corresponding to the target access point, namely, the parameters respectively correspond to a wireless router name, a MAC address of the wireless router, an encryption type of the wireless router or signal strength of the wireless router.

Herein, further preferably, a connection result corresponding to the connection request is returned to the second application through the inter-process communication by the first application. For the connection request of the second application, return parameters corresponding to the connection result may include a service return name, such as "wifi.intent.action.RESULT"; information of the connection service identification, such as "connect" which represents return information indicating which type of service is returned. Further, it may also include return value parameters to represent whether the connection of connection service is successful connection or failed connection, and may also include the cause of failed connection. For example:

{"retcode":0,"retmsg":"ENABLE_MOBILE_FAILED"} or {"retcode":1,"retmsg":" "}.

Figure 2:
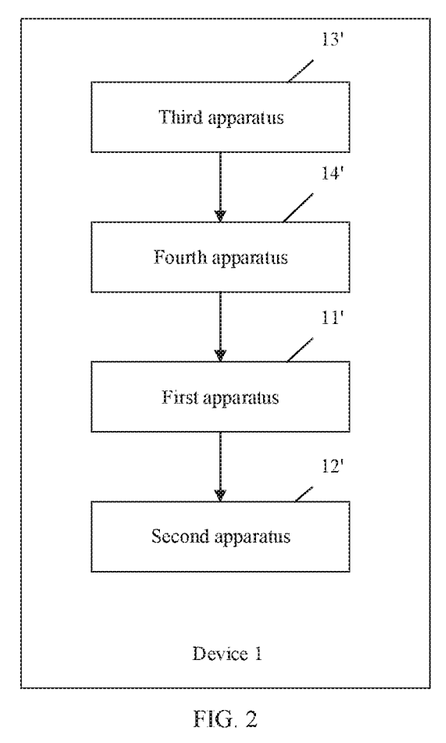
FIG. 2 shows a schematic diagram of a device for establishing wireless connection through a first application on user equipment according to a preferred embodiment of the present application.

FIG. 2 shows a schematic diagram of a device 1 for establishing wireless connection through first application on user equipment according to a preferred embodiment of the present application. Wherein the device 1 includes third apparatus 13', fourth apparatus 14', first apparatus 11' and second apparatus 12'.

Wherein, a searching request regarding the wireless access point sent by the second application that works in the same user equipment as the first application is acquired by the third apparatus 13'; the fourth apparatus 14' acquires one or more candidate wireless access points corresponding to the search request by the first application by the fourth device 14', and provides the one or more candidate wireless access points to the second application. Further, a connection request sent by the second application that works in the same user equipment as the first application is acquired by the first apparatus 11', herein, preferably, the connection request of the target wireless access point in the one or more candidate wireless access points sent by the second application is acquired by the first apparatus 11', wherein, at least the target wireless access point in the one or more candidate wireless access points is represented in the second application; then, according to the access information of the target wireless access point corresponding to the connection request, the second apparatus 12' establishes a wireless connection between the user equipment and the target wireless access point through the first application. Herein, the second apparatus 12' is the same or basically the same as the second apparatus 12 shown in FIG. 1, so the structure of second apparatus 12' is not repeated here and is incorporated herein by reference.

Specifically, herein, one or more corresponding candidate wireless access points, and/or related information of the wireless access point corresponding to the candidate wireless access points, are acquired by the second application through the searching request. Herein, the related information of wireless access point is preferably selected as information of signal strength, information of security level, information of names, information of geographical locations, etc. of the wireless access point. Herein, the connection request may be triggered by a user corresponding to the second application, for example, the user clicks a button corresponding to searching available wireless access points on the user interface of the second application, and then the searching request is launched by the second application; the searching request may also be the searching request of wireless access points launched spontaneously by the second application based on other preset triggering conditions. Herein, the searching request may be realized based on a communication mode agreed by the first application and the second application, for example, the searching request is sent to the first application by the second application based on inter-process communication mode.

Then, the fourth 14' acquires one or more candidate wireless access points corresponding to the searching request through the first application, and provides the one or more candidate wireless access points to the second application. Herein, an alternative scenario is, if the searching request corresponds to the candidate wireless access point available at current location of the user equipment, then one or more candidate wireless access points around the user equipment acquired through wireless scanning way are provided to the second application by the first application. In another preferred scenario, the first application acquires one or more candidate wireless access points corresponding to the searching request from a corresponding network device, and provides the one or more candidate wireless access points to the second application.

Further, preferably, on basis of the searching request of the second application and a corresponding searching result returned by the corresponding first application, a connection request of the target wireless access point in the one or more candidate wireless access points sent by the second application is acquired by the first apparatus 11', wherein, at least the target wireless access point in the one or more candidate wireless access points is represented in the second application. Herein, preferably, a part or a whole of the candidate wireless access points provided to the second application by the first application are represented in the second application, and then, a user corresponding to the second application will determine the target wireless access point in the candidate wireless access points, and launches the corresponding connection operation to the first application based on the target wireless access point, for example, the user clicks certain target wireless access point in the list of the candidate wireless access points in the user interface of the second application, and then the connection request corresponding to the target wireless access point is launched by the second application.

In the present embodiment, through the search request regarding the wireless access point sent by the second application responded by the first application, the device 1 acquire the one or more candidate wireless access points corresponding to the search request through the first application, and provides the one or more candidate wireless access points to the second application. On this basis, further, in another preferred embodiment of the present application, after the one or more candidate wireless access points are provided to the second application by the first application above, and the connection request of the target wireless access point in the one or more candidate wireless access points from the second application is acquired by the first application, and then, the wireless connection between the user equipment and the target wireless access point is established based on the access information of the target wireless access point. Herein, the present application may be based on specific requirements of the connection service provided to the first application by the second application in practical use, to respond distinctively to different requests from the second application. Meanwhile, the result of invoking and execution corresponding to the request is also sent back to the second application. In the above embodiment, no matter the search request of the wireless access point of the second application, or the connection requirement of the wireless access point, or the connection service requirement of other types, are all executed specifically through the first application corresponding to the second application, and executive codes corresponding to the connection operations are not needed to be embedded in the second application and to be executed, thereby security risks to the second application brought by executing unknown codes of other applications in the second application are avoided; also, risks of information leakage are avoided which are caused by directly providing codes of the first application itself or other data information, such as the access information needed by establishing wireless connection, to the second application; meanwhile, the experience optimization of users corresponding to the second application to the related service of wireless connection is also taken into account.

In a preferred embodiment, the fourth device 14' acquires one or more candidate wireless access points corresponding to the search request from the corresponding network equipment through the first application by, and provides the one or more candidate wireless access points to the second application. Herein, preferably, the fourth device 14' includes a third unit (not shown), a fourth unit (not shown), a fifth unit (not shown) and a sixth unit (not shown). Specifically, based on the search request, the third unit acquires the one or more wireless access points around the user equipment in wireless scanning way through the first application. And then, the fourth unit sends an acquirement request of candidate wireless access points to the corresponding network equipment through the first application, wherein, at least one of the one or more wireless access points are included in the acquirement request of the candidate wireless access points. The acquirement request of the candidate wireless access points which may be based on preset number or conditions of the wireless access points includes at least one of the one or more scanning wireless access points. Then, one or more candidate wireless access points returned from the network equipment are acquired by the fifth unit, wherein, the candidate wireless access point is included in the one or more wireless access points. Herein, preferably, based on the wireless access points and the corresponding related information of the wireless access point stored by the network equipment, the wireless access points which have corresponding access information are determined by the network equipment, and then the wireless access point is returned to the user equipment as the candidate wireless access point; or, further, preferably, in the wireless access points which have the corresponding access information in the network equipment, based on preset filtering conditions, such as condition of signal strength of the wireless access point and condition of security level, one or more candidate wireless access points which fit the conditions are preferably selected, and the one or more candidate wireless access points are provided to the user equipment. Herein, further, preferably, the related information of the wireless access point—corresponding to the one or more candidate wireless access points are also acquired by the user equipment at the same time. Then, the sixth unit provides the one or more candidate wireless access points to the second application through the first application.

In a preferred embodiment, a search request regarding wireless access point sent by the second application that works in the same user equipment as the first application is acquired by the third device 13', wherein, the connection request includes information of application identification, information of the connection service identification and a service invocation name of the first application.

Specifically, in the present application, the first application can communicate with the second application based on the agreed away, for example, communication is realized through inter-process communication mode by the first application and the second application. Taking the inter-process communication mode for example, communication parameters corresponding to the connection request are pre-defined and agreed by the first application and the second application, herein, the information of application identification, the information of the search service identification and the service invocation name of the first application are included preferably. The information of application identification may be a name of an application package of the first application, or other identification information, such as "com.abcd.wifilocating"; the information of the search service identification is used to represent information of a specific service invoked by the second application through the first application required, such as parameters like "query" that represent the service of searching one or more candidate wireless access points; the service invocation name corresponds to the agreed inter-application communication way. Take the inter-process communication mode for example, the service invocation name may include "wifi.intent.action.CALL". Then, information of application identification, information of the connection service identification and a service invoking name of the first application are added to the connection request sent by the second application. Herein, the search result corresponding to the search request returned by the first application is monitored by the second application through the inter-process communication.

On this basis, preferably, at least any one of following parameters are included in the connection request: a wireless router name, such as SSID (Service Set Identifier) information of the wireless access point corresponding to the wireless router; a MAC (Media Access Control) address of the wireless router, such as BSSID (Basic Service Set Identifier) information of the wireless access point corresponding to the wireless router; an encryption type of the wireless router, for example, security Level type may be OPEN, WEP or WPA; signal strength of the wireless router, such as RSSI (Received Signal Strength indication) information. A preferred scenario is that, the connection request may be a connection request which includes the determined target wireless access point, wherein, the connection request may include information of the wireless router name, the MAC address of the wireless router, the encryption type of the wireless router or the signal strength of the wireless router and the like. Herein, the person with ordinary skill in the art should be able to understand that, the parameters above are merely examples, other parameters that currently exist or come up in future suitable for the present application should be included within the protection scope of the present application, and should be incorporated herein in the protection scope by reference.

Preferably, application-related information of the second application is also included in the search request; wherein, one or more candidate wireless access points corresponding to the search request are acquired by the fourth device 14' through the first application, and the one or more candidate wireless access points are provided to the second application, wherein, the candidate wireless access point and application-related information of the second application are matched.

Specifically, in practical use, a preferred result of the candidate wireless access point acquired based on the search request is, providing a target wireless access point matching the characteristics of the application and the requirement of the application for each second application. Based on this, the search request of the second application may include or reflect the matching requirement through the application-related information. For example, the application-related information may be application type information of the second application, or may be communication requirement information of the second application. Further, the target wireless access point and the application-related information are matched. For example, if the second application is an application of the type of payment, then high security level is required by the corresponding target wireless access point; and for another example, if the second application is an application of the type of video, then strong signal strength is required by the corresponding target wireless access point. Herein, those skilled in the art should be able to understand that, the application-related information above is merely an example, other application-related information that currently exists or comes up in future should be included within the protection scope of the present application if the other application-related information fits for the present application, and should be incorporated in the protection scope herein by reference.

Preferably, the search request based on the inter-process communication mode is sent to the first application by the second application. Herein, in the present application, the inter-application communication may be carried out based on the agreed way by the first application and the second application. The agreed way may be preferably the inter-process communication mode. Herein, the interface corresponding to the connection service may be provided to the second user by the first application, and the second user uses standard inter-process communication means to add communication parameters agreed by the first application and the second application in the connection request, and then based on the inter-process communication mode, the second user monitors the search result corresponding to the search request returned by the first application.

Specifically, a preferred scenario is, the search request includes information of application identification of the first application such as "com.abcd.wifilocating"; information of the search service identification such as "query"; and a service invocation name, such as "wifi.intent.action.CALL"; also includes a list of the wireless access point that will be searched. The list includes respective parameters corresponding to the wireless router name, the MAC address of the wireless router, the encryption type of the wireless router or the signal strength of the wireless router, for example:

[{"bssid":"c0:3d:46:00:71:8e","ssid":"TPLINK-718Dq", "securityLevel":"2","rssi":"-47"},
{"bssid":"f0:b4:29:63:c2:c2","ssid":"TPLINK_mkm", "securityLevel":"2","rssi":"-51"},
{"bssid":"c0:3d:46:01:17:47","ssid":"aaa_temh","securityLevel":"2","rssi":"-53"}].

In addition, further preferably, a search result corresponding to the search request is returned to the second application by the first application through the inter-process communication, and returned parameters corresponding to the search result may include a service return name, such as "wifi.intent.action.RESULT"; information of the search service identification, such as "query" which represents return information indicating which type of service is returned; further, may also include the return searched information of candidate wireless access point list which may provide services, including the wireless router name, the MAC address of the wireless router, the encryption type of the wireless router and the signal strength of the wireless router and the corresponding parameters corresponding to the acquired wireless access point, or status of access information, such as "keyStatus", for example:

[{"bssid":"f0:b4:29:63:c2:c3","ssid": "TPLINK_20160530","rssi":"-60", "keyStatus":1,"securityLevel":"2","apid": "CDD6D594D23CD8FF3F1A189391392A6A"},
{"bssid":"F6:6A:92:2A:73:78","ssid":"TPLINK_test_zj1@_992","rssi":"-67","keyStatus":1,"securityLevel": "2","apid": "B83B86346AA51C8AD02F375A61A3EF88"},
{"bssid":"C0:3D:46:00:35:36","ssid": "TPLINK_suzzy_3q_2","rssi":"-58":"keyStatus:":1,"securityLevel":"2","apid": "85CD36F0F3F8C14C4AB8C274F08A0931"}].

Then, further preferably, a target wireless access point is determined in the above candidate wireless access points by the second application. Specifically, in the above example, the status of access information "keyStatus" corresponding to each search result is 1, which is corresponding to available access information, then the above three candidate wireless access points may be provided as candidate wireless access point to the second application. Further, based on the target wireless access point which is determined from the above many candidate wireless access points, the corresponding connection operation is launched by the second application to the first application. For example, the information of wireless router corresponding to the target wireless access point determined by the second application, namely, the wireless router name, the MAC address of the wireless router, the encryption type of the wireless router and the signal strength of the wireless router is:

{"bssid":"F0:B4:29:63:C2:C3","ssid": "TPLINK_20160530","securityLevel": "2","rssi":"-60",}:

In addition, the connection request includes the information of application identification of the first application, such as "com.abcd.wifilocating"; the information of connection service identification, such as "connect"; and the service invocation name, such as "wifi.intent.action.CALL".

Then, the wireless connection between the user equipment and the target wireless access point is established according to the access information of the target wireless access point corresponding to the connection request through the first application; further, the connection result corresponding to the connection request is returned to the second application through the inter-process communication by the first application. For the connection request of the second application, return parameters corresponding to the connection result may include the service return name, such as "wifi.intent.action.RESULT"; information of the connection service identification, such as "connect"; further, it may also include return value parameters to represent whether the connection of the connection service is successful connection or failed connection, and may also include the cause of failed connection. For example:

{"retcode":0,"retmsg":"ENABLE_MOBILE_FAILED"} or {"retcode":1,"retmsg":" "}.

Figure 3:
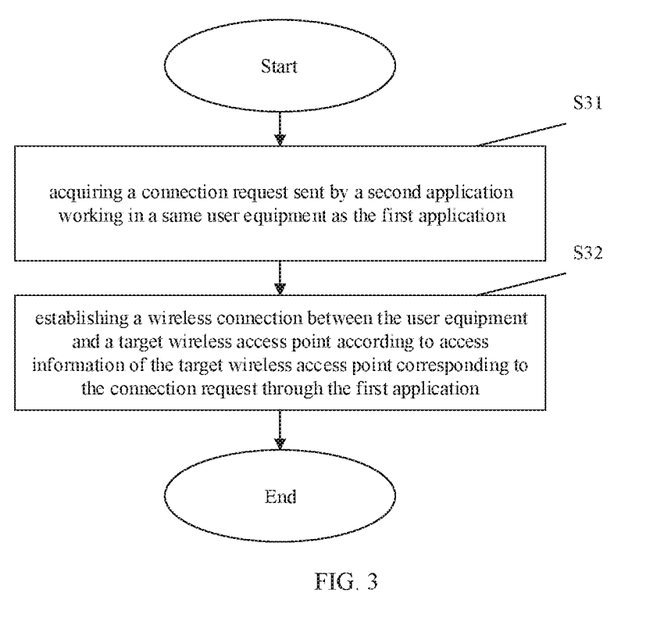
FIG. 3 shows flowchart of a method for establishing wireless connection through a first application on user equipment according to another aspect of the present application.

FIG. 3 shows flowchart of a method for establishing wireless connection through first application on user equipment according to another aspect of the present application. Wherein, the method includes step S31 and step S32.

Wherein, in the step S31, the connection request sent by the second application that works in the same user equipment as the first application is acquired by the device 1; in the step S32, the device 1 establishes the wireless connection between the user equipment and the target wireless access point according to the access information of the target wireless access point corresponding to the connection request through the first application 1.

Herein, the user equipment includes but is not limited to kinds of smart terminals, such as personal computers, smart mobile devices, etc. In the present application, the device 1 may include the user equipment; or, the device 1 is the user equipment; or, the device belongs to the user equipment. Herein, preferably, in the corresponding embodiment, the device 1 is corresponds to the user equipment. At this point, for the convenience of description, the device 1 and the user equipment can be used interchangeably. Herein, the establishment of the wireless connection may preferably be a wireless network accessed corresponding to the wireless access point by the user equipment, i.e. the wireless hotspot. The wireless network includes but is not limited to a wireless local network based on the IEEE 802.11 series standard protocols, for example, a wireless local network based on the protocol IEEE 802.11b, namely, the so-called WiFi network.

Specifically, in the step S31, the device 1 acquires the connection request sent by the second application that works in the same user equipment as the first application. Preferably, the user equipment loads and runs the first application and the second application simultaneously. Herein, the first application includes applications that provide a wireless connection service, for example, an application developed by the WiFi service provider; the second application is the application that invokes the wireless connection service, which can be a system application corresponding to the user equipment, or any other third-party application that requires invoking the wireless connection service. Taking user equipment as a smart mobile device as an example, the third party application may include but is not limited to kinds of native applications, or web applications. At this point, the connection request sent by the second application is acquired by the user equipment, preferably, by the first application in the user equipment. Herein, the connection request may be based on a networking request sent by a user corresponding to the second application, for example, the user clicks a button corresponding to the establishment of the wireless connection on the user interface of the second application, and then the connection request is launched by the second application; the connection request may also be the wireless network connection request launched spontaneously by the second application based on other preset triggering conditions. Herein, the connection request may be realized based on a communication mode agreed by the first application and the second application, for example, the connection request is sent to the first application by the second application based on inter-process communication mode.

Then, in the step S32, the device 1 establishes wireless connection between the user equipment and the target wireless access point according to the access information of the target wireless access point corresponding to the connection request through the first application. Wherein, the connection request may be a connection request that includes the determined target wireless access point, or a connection request that does not include the determined target wireless access point. Herein, in an alternative scenario: if in the user equipment, such as the first application in the user device, the access information of one or more wireless access points corresponding to the connection request are pre-stored or pre-recorded, then when the determined target wireless access point is included in the connection request, the access information of the target wireless access point is directly determined, and then the corresponding wireless connection is established; or, when the determined target wireless access point is not included in the connection request, target wireless access point in one or more wireless access points is determined by the first application, and according to the access information of the target wireless access point by the first application, the wireless connection between the user equipment and the target wireless access point is established. In addition, in another alternative scenario: if in the user equipment, the access information of one or more wireless access points corresponding to the connection request is not pre-stored or pre-recorded, then based on the access information of the target wireless access point corresponding to the connection request acquired from a network device corresponding to the user equipment, the first application establishes the wireless connection between the user equipment and the target wireless access point.

Herein, the network device includes but is not limited to a computer, a network host, a single network server, multiple network server sets, or a cloud composed of multiple servers. Preferably, the network device stores mass wireless access points and related information of the wireless access points, wherein, the related information of the wireless access points includes but is not limited to the access information of the wireless access points, information of signal strength, information of security level, information of names, information of geographical locations, etc.

In the present application, according to the access information of the target wireless access point corresponding to the connection request, the device 1 establishes the wireless connection between the user equipment and the target wireless access point through the first application based on the connection request sent by the second application that works in the same user equipment as the first application. Herein, for the second application with connectivity requirement, as the second application only needs to send the corresponding connection request, the wireless connection between the user equipment and the target wireless access point can be effectively responded and executed completely by the first application corresponding to the second application; thus, the corresponding user of the second application will quickly apperceive the implementation of the connection service. Based on the present application, a requirement of connection requests is realized through connection operations of the first application by means of the second application, and executive codes corresponding to the connection operations are not needed to be embedded and executed in the second application, thereby security risks to the second application due to executing unknown codes of other applications in the second application are avoided. Meanwhile, risks of information leakage are avoided which are caused by directly providing codes of the first application itself or other data information, such as the access information needed by establishing wireless connection, to the second application. In addition, based on the present application, the second application establishes the wireless connection through the first application, compared with the traditional technology of invoking the wireless connection service by the first application directly through the system application of the device 1, the selection range of the wireless access points of the available target acquired by the second application through the first application is broader than that of invoking the wireless connection service by the first application directly through the system application of the device 1, and the stability of the wireless connection is better.

In a preferred embodiment, the step S32 includes step S321 (not shown) and step S322 (not shown).

Wherein, in the step S321, the device 1 acquires the access information of one or more wireless access points corresponding to the connection request from a corresponding network device through the first application; in step S322, the device 1 establishes wireless connection between the user equipment and the target wireless access point of the one or more wireless access points according to the access information through the first application. At this point, the access information acquired from the corresponding network device by the first application may be assumed to exist in the cases listed below: in the user equipment, the access information of one or more wireless access points corresponding to the connection request is not pre-stored or pre-recorded; or in the user equipment, the accuracy of the access information pre-stored or pre-recorded of the wireless access point is lower, or satisfying preset conditions of updating the access information.

Herein, preferably, the step S321 includes step S3211 (not shown), step S3212 (not shown) and step S3213 (not shown).

Wherein, in the step S3211, one or more scanning wireless access points around the user equipment through wireless scanning by the first application are acquired by the device 1 based on the connection request. Then, in step S3212, an access information acquirement request is sent to the corresponding network device through the first application by the device 1, wherein, at least one of the one or more scanning wireless access points are included in the access information acquirement request, herein, at least one of the one or more scanning wireless access points are included in the information acquirement request which may be based on preset number or conditions of the scanning wireless access points. Then, in step S3213, the access information of the one or more scanning wireless access points returned by the network device is acquired by the device 1, wherein, the wireless access point is included in the one or more scanning wireless access points, herein, preferably, based on the wireless access points stored by the network device and the corresponding related information of the wireless access points, the scanning wireless access points which have the corresponding access information in the network device are determined by the network device, and then the access information of the scanning wireless access point is returned to the user equipment; or, further, preferably, in the scanning wireless access points which have the corresponding access information in the network equipment, based on preset filtering conditions, such as condition of signal strength of the wireless access point and condition of security level, etc., one or more wireless access points which fit the conditions are preferably selected, and the corresponding access information is provided to the user equipment. Then, in step S322, according to the access information, the device 1 establishes wireless connection between the user equipment and the target wireless access point of the one or more wireless access points through the first application. At this point, if there are many wireless access points that are returned, then a wireless access point may be selected randomly or preferably to be the target wireless access point.

In a preferred embodiment, in step S31, the connection request sent by the second application that works in the same user equipment as the first application is required by the device 1, wherein, information of application identification, information of the connection service identification and a service invocation name of the first application are included in the connection request.

Specifically, in the present application, the first application may communicate with the second application based on agreed way, for example, communication is realized through inter-process communication mode between the first application and the second application. Take the inter-process communication mode for example, communication parameters corresponding to the connection request are pre-defined and agreed by the first application and the second application, herein, the information of application identification, the information of the connection service identification and the service invocation name of the first application are included preferably. The information of application identification may be a name of an application package of the first application, or other identification information, such as "com.abcd.wifilocating"; the information of the connection service identification is used to represent information of a specific service invoked through the second application which is required by the first application, such as parameters like "connect", auto connect that represent connecting the wireless access point to the service; the service invocation name corresponds to the agreed inter-process communication mode. Take the inter-process communication mode for example, the service invocation name may include "wifi.intent.action.CALL" Then, information of application identification, information of the connection service identification and a service invocation name of the first application are added to the connection request sent by the second application.

On this basis, preferably, at least any one of following parameters is included in the connection request: a wireless router name, such as SSID (Service Set Identifier) information of the wireless access point corresponding to the wireless router; a MAC (Media Access Control) address of the wireless router, such as BSSID (Basic Service Set Identifier) information of the wireless access point corresponding to the wireless router; an encryption type of the wireless router, for example, securityLevel type may be OPEN, WEP or WPA; signal strength of the wireless router, such as RSSI (Received Signal Strength Indication) information. A preferred scenario is that, the connection request may be a connection request which includes the determined target wireless access point, herein, the connection request may include information of the wireless router name, the MAC address of the wireless router, the encryption type of the wireless router or the signal strength of the wireless router and the like. Herein, those skilled in the art should be able to understand that the parameters above are merely examples, other parameters that currently exist or come up in future suitable for the present application should be included within the protection scope of the present application, if the other parameters fit for the present application, and should be incorporated herein in the protection scope by reference.

Preferably, application-related information of the second application is also included in the connection request; wherein, according to the access information of the corresponding target wireless access point, the device 1 establishes the wireless connection between the user equipment and the target wireless access point through the first application, wherein, the target wireless access point and application-related information of the second application are matched.

Specifically, in practical use, an optimization scenario of establishing wireless connection is based on application characteristics and application requirements of each second application, the target wireless access point with relatively high matching degree is connected to the second application. Based on the scenario, the matching requirement of the connection request of the second application may be included or reflected through the application-related information. For example, the application-related information may be application type information of the second application, or may be communication requirement information of the second application. Further, the target wireless access point and the application-related information are matched. For example, if the second application is an application of the type of payment, then high security level is required by the corresponding target wireless access point; and for another example, if the second application is an application of the type of video, then high signal strength is required by the corresponding target wireless access point. Herein, those skilled in the art should be able to understand that the application-related information above is merely an example, other application-related information that currently exists or comes up in future suitable for the present application should be included within the protection range of the present application if the other application-related information fits for the present application, and should be incorporated herein in the protection scope by reference.

Preferably, the connection request based on the inter-process communication mode is sent to the first application by the second application. Herein, in the present application, the first application may communicate with the second application based on agreed way. The agreed way may be preferably the inter-process communication mode. Herein, the interface corresponding to the connection service may be provided to the second user by the first application, and the second user uses standard inter-process communication means to add parameters agreed by the first application and the second application to the connection request.

Specifically, herein, a preferred scenario is, the connection request includes the connection request with the determined target wireless access point. At this point, the connection request includes information of application identification of the first application such as "com.abcd.wifilocating"; information of the connection service identification such as "connect"; and a service invocation name, such as "wifi.intent.action.CALL"; the connection request also includes information of the wireless router corresponding to the target access point, namely, parameters respectively corresponding to the wireless router name, the MAC address of the wireless router, the encryption type of the wireless router or the signal strength of the wireless router, for example:

{"bssid":"c0:3d:46:00:71:8e","ssid":"TPLINK-718Dq", "securityLevel":"2","rssi":"–47"}.

Herein, another preferred scenario is, the connection request does not include the connection request of the corresponding target wireless access point, but relies on selecting the target wireless access point for the second application by the first application, at this point, the connection request includes information of application identification of the first application such as "com.abcd.wifilocating"; information of the connection service identification, such as "autoconnect" that represents connecting a best WiFi by automatic search; and a service invocation name "wifi.intent.action.CALL"; also includes information of the wireless router corresponding to the target access point, namely, the parameters respectively corresponding to a wireless router name, a MAC address of the wireless router, an encryption type of the wireless router or signal strength of the wireless router.

Herein, preferably, a connection result corresponding to the connection request is returned to the second application through the inter-process communication by the first application. For the connection request of the second application, return parameters corresponding to the connection result may include a service return name, such as "wifi.intent.action.RESULT", information of the connection service identification, such as "connect" which represents return information indicating which type of service is returned; further, may also include return value parameters to represent whether the connection of the connection service is successful connection or failed connection, and may also include the cause of failed connection. For example:

{"retcode":0,"retmsg":"ENABLE_MOBILE_FAILED"} or {"retcode":1,"retmsg":" "}.

Figure 4:
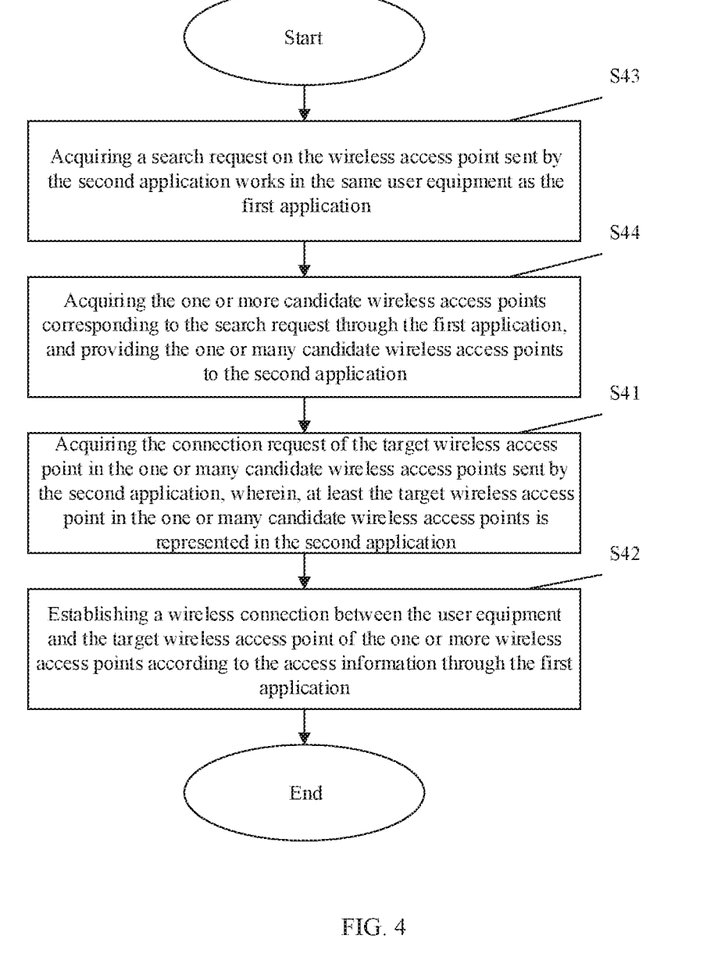
FIG. 4 shows a flowchart of a method for establishing wireless connection through a first application on user equipment according to a preferred embodiment of the present application.

FIG. 4 shows a flowchart of a method for establishing wireless connection through first application on user equipment according to a preferred embodiment of the present application. Wherein, the method includes step S43, step S44, step S41 and step S42.

Wherein, in step S43, a search request regarding the wireless access point sent by the second application that works in the same user equipment as the first application is acquired by the device 1; in step S44, the device 1 acquires one or more candidate wireless access points corresponding to the search request through the first application, and provides the one or more candidate wireless access points to the second application. Further, in step S41, a connection request sent by the second application that works in the same user equipment as the first application is acquired by the device 1, herein, preferably, in step 41, the connection request of the target wireless access point in the one or more candidate wireless access points sent by the second application is acquired by the device 1, wherein, at least the target wireless access point in the one or more candidate wireless access points is represented in the second application; then, in step S42, according to the access information of the target wireless access point corresponding to the connection request, the device 1 establishes a wireless connection between the user equipment and the target wireless access point through the first application. Herein, the step S42 is the same or basically the same as the step S32 shown in FIG. 3, so the step S42 is not repeated here and is incorporated herein by reference.

Specifically, herein, one or more corresponding candidate wireless access points, and/or related information of wireless access point corresponding to the candidate wireless access points, are acquired by the second application through the search request. Herein, the related information of the wireless access point is preferably selected as information of signal strength, information of security level, information of names, information of geographical locations, etc. of the wireless access point. Herein, the connection request may be triggered by a user corresponding to the second application, for example, the user clicks a button corresponding to searching available wireless access points on the user interface of the second application, and then the search request is launched by the second application; the search request may also be the search request of wireless access points launched spontaneously by the second application based on other preset triggering conditions. Herein, the search request may be realized based on a communication mode appointed by the first application and the second application, for example, the search request is sent to the first application by the second application based on inter-process communication mode.

Then, in step S44, the device 1 acquires one or more candidate wireless access points corresponding to the search request through the first application, and provides the one or more candidate wireless access points to the second application. Herein, an alternative scenario is, if the search request corresponding to the candidate wireless access point is available at current location of the user equipment, then one or more candidate wireless access points around the user equipment acquired through wireless scanning way are provided to the second application by the first application. Another preferred scenario is, one or more candidate wireless access points corresponding to the search request are acquired from a corresponding network device by the first application, and the one or more candidate wireless access points are provided to the second application.

Further, preferably, on basis of the search request of the second application and a corresponding search result returned by the corresponding first application, in step S41, a connection request of the target wireless access point in the one or more candidate wireless access points sent by the second application is acquired by the device 1, wherein, at least the target wireless access point in the one or more candidate wireless access points is represented in the second application. Herein, preferably, a part or a whole of the candidate wireless access points provided to the second application by the first application are represented in the second application, and then, a user corresponding to the second application will determine the target wireless access point in the candidate wireless access points, and launches the corresponding connection operation to the first application based on the target wireless access point, for example, the user clicks certain target wireless access point in the list of the candidate wireless access points in the user interface of the second application, and then the connection request corresponding to the target wireless access point is launched by the second application.

In the present embodiment, through the search request regarding the wireless access point sent by the second application responded by the first application, the device 1 acquire the one or more candidate wireless access points corresponding to the search request through the first application b, and provides the one or more candidate wireless access points to the second application. On this basis, further, in another preferred embodiment of the present application, after the one or more candidate wireless access points are provided to the second application by the first application above, and the connection request of the target wireless access point in the one or more candidate wireless access points from the second application is acquired by the first application, and then, the wireless connection between the user equipment and the target wireless access point is established based on the access information of the target wireless access point. Herein, the present application may be based on specific requirements of the connection service provided to the first application by the second application in practical use, to response distinctively to different requests from the second application. Meanwhile, the result of invoking and execution corresponding to the request is also sent back to the second application. In the above embodiment, no matter the search request of the wireless access point of the second application, or the connection requirement of the wireless access point, or the connection service requirement of other types, all are executed specifically through the first application corresponding to the second application, and executive codes corresponding to the connection operations are not needed to be embedded and executed in the second application, thereby security risks brought by executing unknown codes of other applications in the second application are avoided; also, risks of information leakage are avoided which are caused by directly providing codes of the first application itself or other data information, such as the access information needed by establishing wireless connection, to the second application. Meanwhile, the experience optimization of users corresponding to the second application to the related service of wireless connection is also taken into account.

In a preferred embodiment, in step S44, one or more candidate wireless access points corresponding to the search request are acquired from the corresponding network device through the first application by the device 1, and the one or more candidate wireless access points are provided to the second application. Herein, preferably, the step S44 includes step S441 (not shown), step S442 (not shown), step S443 (not shown) and step S444 (not shown). Specifically, in step S441, based on the search request, the device 1 acquires the one or more candidate wireless access points around the user equipment in wireless scanning way through the first application. And then, in step S442, the device 1 sends a candidate wireless access point acquirement request to the corresponding network device through the first application, wherein, at least one of the one or more scanning wireless access points is included in the candidate wireless access point acquirement request, herein, at least one of the one or more scanning wireless access points is included in the candidate wireless access point acquirement request which may base on preset number or conditions of the scanning wireless access points. Then, in step S443, one or more candidate wireless access points returned from the network device is acquired by the device 1, wherein, the candidate wireless access point is included in the one or more candidate wireless access points. Herein, preferably, based on the stored wireless access points and the corresponding related information of the wireless access point, the wireless access points which have corresponding access information in the network device are determined by the network equipment, and then the wireless access point is returned to the user equipment as the candidate wireless access point; or, further, preferably, in the wireless access points which have the corresponding access information in the network equipment, based on preset filtering conditions, such as condition of signal strength of the wireless access point and condition of security level, one or more candidate wireless access points which fit the conditions are preferably selected, and the one or more candidate wireless access points are provided to the user equipment. Herein, further, preferably, related information of the wireless access point corresponding to the one or more candidate wireless access points are also acquired at the same time by the user equipment. Then, in step S444, the device 1 provides the one or more candidate wireless access points to the second application through the first application.

In a preferred embodiment, in step S43, a search request regarding wireless access point sent by the second application that works in the same user equipment as the first application is acquired by the device 1, wherein, the search request includes information of application identification, information of the connection service identification and a service invocation name of the first application.

Specifically, in the present application, the first application may communicate with the second application based on agreed way, for example, communication is realized through inter-process communication mode by the first application and the second application. Take the inter-process communication mode for example, communication parameters corresponding to the connection request are pre-defined and agreed by the first application and the second application, herein, the information of application identification, the information of the search service identification and the service invocation name of the first application are included preferably. The information of application identification may be a name of an application package of the first application, or other identification information, such as "com.abcd.wifilocating"; the information of the search service identification is used to represent information of a specific service invoked by the second application through the first application, such as parameters like "query" that represent the service of searching one or more candidate wireless access points; the service invocation name corresponds to the agreed inter-process communication mode. Take the inter-process communication mode for example, the service invocation name may include "wifi.intent.action.CALL". Then, information of application identification, information of the connection service identification and a service invocation name of the first application are added to the connection request sent by the second application. Herein, the search result corresponding to the search request returned by the first application is monitored by the second application through the inter-process communication.

On this basis, preferably, at least any one of following parameters is included in the connection request: a wireless router name, such as SSID (Service Set Identifier) information of the wireless access point corresponding to the wireless router; a MAC (Media Access Control) address of the wireless router, such as BSSID (Basic Service Set Identifier) information of the wireless access point corresponding to the wireless router; an encryption type of the wireless router, for example, securityLevel type may be OPEN, WEP or WPA; signal strength of the wireless router, such as RSSI (Received Signal Strength Indication) information. Herein, information of parameters above includes description information of searched wireless access point, thereout, the specific candidate wireless access point that fits the requirement of the second application better is returned for the second application. Herein, those skilled in the art should be able to understand that, the parameters above are merely examples, other parameters that currently exist or come up in future should be included within the protection range of the present application if the other parameters fit for the present application, and should be included incorporated in the protection scope herein by reference.

Preferably, application-related information of the second application is also included in the search request; wherein, one or more candidate wireless access points corresponding to the search request are acquired by the device 1 through the first application, and the one or more candidate wireless access points are provided to the second application, wherein, the candidate wireless access point and application-related information of the second application are matched.

Specifically, in practical use, a preferred result of the candidate wireless access point acquired based on the search request is, providing a target wireless access point matched characteristics of the application and the requirement of the application for each second application. Based on this, the search request of the second application may include or reflect the matching requirement through the application-related information. For example, the application-related information may be application type information of the second application, or may be communication requirement information of the second application. Further, the target wireless access point and the application-related information are matched. For example, if the second application is an application of the type of payment, then high security level is required by the corresponding target wireless access point; and for another example, if the second application is an application of the type of video, then strong signal strength is required by the corresponding target wireless access point. Herein, those skilled in the art should be able understand that the application-related information above is merely an example, other application-related information that currently exists or comes up in future should be included within the protection range of the present application if the other application-related information fits for the present application, and should be incorporated in the protection scope by reference.

Preferably, the search request based on the inter-process communication mode is sent to the first application by the second application. Herein, in the present application, the inter-application communication may be carried out based on the agreed way by the first application and the second application. The agreed way may be preferably the inter-process communication mode. Herein, the interface corresponding to the connection service may be provided to the second user by the first application, and the second user uses standard inter-process communication means to add communication parameters agreed by the first application and the second application in the connection request, and then based on the inter-process communication mode, the second user monitors the search result corresponding to the search request returned by the first application.

Specifically, a preferred scenario is, the search request includes information of application identification of the first application such as "com.abcd.wifilocating"; information of the search service identification such as "query"; and a service invocation name, such as "wifi.intent.action.CALL"; also includes a list of the wireless access point that will be searched. The list includes respective parameters corresponding to the wireless router name, the MAC address of the wireless router, the encryption type of the wireless router or the signal strength of the wireless router, for example:

[{"bssid":"c0:3d:46:00:71:8e","ssid":"TPLINK-718Dq", "securityLevel":"2","rssi":"−47"}, {"bssid":"f0:b4:29:63:c2:c2","ssid":"TPLINK_mkm", "securityLevel":"2","rssi":"−51"}, {"bssid":"c0:3d:46:01:17:47","ssid":"aaa_temh","securityLevel":"2","rssi":"−53"}].

In addition, preferably, a search result corresponding to the search request is returned to the second application by the first application through the inter-process communication, and return parameters corresponding to the search result may include a service return name, such as "wifi.intent.action.RESULT", information of the search service identification, such as "query" which represents return information indicating which type of service is returned; further, it may also include the return searched information of candidate wireless access point list which may provide services, including the wireless router name, the MAC address of the wireless router, the encryption type of the wireless router and the signal strength of the wireless router and the corresponding parameters corresponding to the acquired wireless access point, or status of access information, such as "keyStatus", for example:

[{"bssid":"f0:b4:29:63:c2:c3","ssid": "TPLINK_20160530","rssi":"−60", "keyStatus":1, "securityLevel":"2","apid": "CDD6D594D23CD8FF3F1A189391392A6A"}, {"bssid":"F6:6A:92:2A:73:78","ssid":"TPLINK_test_zj1@_992","rssi":"−67","keyStatus":1,"securityLevel":"2","apid":"B83B86346AA51C8AD02F375A61A3EF88"},
{"bssid":"C0:3D:46:00:35:36","ssid":"TPLINK_suzzy_3q_2","rssi":"−58","keyStatus:":1,"securityLevel":"2","apid":"85CD36F0F3F8C14C4AB8C274F08A0931"}].

Then, preferably, a target wireless access point is determined in the above candidate wireless access points by the second application. Specifically, in the above example, the status of access information "keyStatus" corresponding to each of the search result is 1, which is corresponding to available access information, then the above three candidate wireless access points may be provided as candidate wireless access points to the second application. Further, based on the target wireless access point, which is determined from the above many candidate wireless access points by the second application, the corresponding connection. operation is launched to the first application by the second application. For example, the information of wireless router corresponding to the target wireless access point determined by the second application, namely, the wireless router name, the MAC address of the wireless router, the encryption type of the wireless router and the signal strength of the wireless router is:

{"bssid":"f0:b4:29:63:c2:c3", "ssid":"TPLINK_20160530","securityLevel":"2","rssi":"−60"}, In addition, the connection request includes the information of application identification of the first application, such as "com.abcd.wifilocating" of the first application; the information of connection service identification such as "connect"; and the service invocation name, such as "wifi.intent.action.CALL".

Then, the wireless connection between the user equipment and the target wireless access point is established according to the access information of the target wireless access point corresponding to the connection request through the first application. Further, the connection result corresponding to the connection request is returned to the second application through the inter-process communication by the first application. For the connection request of the second application, return parameters corresponding to the connection result may include the service return name, such as "wifi.intent.action.RESULT"; information of the connection service identification, such as "connect"; further, it may also include return value parameters to represent whether the connection of the connection service is successful connection or failed connection, and may also include the cause of failed connection. For example:

{"retcode":0,"retmsg":"ENABLE_MOBILE_FAILED"} or {"retcode":1,"retmsg":" "}.

It is obvious to those skilled in the art that the present application is not limited to the details of the above-described exemplary embodiment, and the present application can be implemented in other specific forms without departing from the spirit or essential characteristics of the application. Therefore, the present embodiments are to be considered as illustrative and not restrictive, and the scope of the invention is defined by the appended claims instead of the above specification. All changes in the meaning and scope of equivalent elements within the claims are included in this application. Any reference signs in the claims should not be construed as limiting the claims. In addition, it is to be understood that the word "comprising" does not exclude other elements or steps, and singularity does not exclude plurality. A plurality of units or devices recited in the device claims may also be implemented by a unit or device by software or hardware. The first, second words and the like are used to denote names and do not denote any particular order.

What is claimed is:

1. A method for establishing a wireless connection through a first application on a user equipment, comprising:
    acquiring a connection request sent by a second application working in the user equipment, wherein the first application works in the user equipment; and
    establishing a wireless connection between the user equipment and a target wireless access point according to access information of the target wireless access point corresponding to the connection request through the first application;
    when the access information of the target wireless access point corresponding to the connection request is pre-stored or pre-recorded in the user equipment, then when the connection request contains a determined target wireless access point, the access information of the target wireless access point is directly determined, and then the wireless connection is established; or when the connection request does not contain the determined target wireless access point, the target wireless access point is determined by the first application, and according to the access information of the target wireless access point, the wireless connection between the user equipment and the target wireless access point is established by the first application;
    when the access information of the target wireless access point corresponding to the connection request is not pre-stored or pre-recorded in the user equipment, then based on the access information of the target wireless access point corresponding to the connection request acquired from a network device corresponding to the user equipment, the wireless connection between the user equipment and the target wireless access point is established by the first application.

2. The method according to claim 1, wherein the establishing wireless connection between the user equipment and the target wireless access point according to the access information of the target wireless access point corresponding to the connection request through the first application comprises:
    acquiring access information of one or more wireless access points corresponding to the connection request from a corresponding network device through the first application; and
    establishing a wireless connection between the user equipment and the target wireless access point of the one or more wireless access points according to the access information through the first application.

3. The method according to the claim 2, wherein the acquiring access information of one or more wireless access points corresponding to the connection request from the corresponding network device through the first application comprises:
    acquiring one or more scanning wireless access points around the user equipment through a wireless scanning way by the first application based on the connection request;
    sending an access information acquirement request to the corresponding network device through the first application, wherein the access information acquirement request comprises at least one of the one or more scanning wireless access points; and acquiring the access information of the one or more wireless access points returned by the corresponding network device, wherein the one or more scanning wireless access points comprise the wireless access point.

4. The method according to claim 1, wherein the acquiring the connection request sent by the second application working in the user equipment comprises:
acquiring the connection request sent by the second application works in the same user equipment, wherein the connection request comprises information of an application identification, information of a connection service identification and a service invocation name of the first application.

5. The method according to claim 4, wherein the connection request further comprises at least one of the following parameters:
a name of a wireless router;
a Media Access Control (MAC) address of the wireless router;
an encryption type of the wireless router; and
signal strength of the wireless router.

6. The method according to claim 4, wherein the connection request further comprises application-related information of the second application;
wherein the target wireless access point and application-related information of the second application are matched.

7. The method according to claim 4, wherein the connection request is sent to the first application by the second application based on an inter-process communication mode, wherein the second application is a web application.

8. The method according to claim 1, wherein before acquiring the connection request sent by the second application working in the user equipment, the method further comprises:
acquiring a search request regarding the wireless access point sent by the second application works in the user equipment, wherein the first application works in the user equipment; and
acquiring one or more candidate wireless access points corresponding to the search request through the first application, and providing the one or more candidate wireless access points to the second application.

9. The method according to claim 8, wherein the acquiring the connection request sent by the second application working in the user equipment comprises:
acquiring the connection request of the target wireless access point in the one or more candidate wireless access points sent by the second application, wherein at least the target wireless access point in the one or more candidate wireless access points is represented in the second application.

10. The method according to claim 8, wherein the acquiring one or more candidate wireless access points corresponding to the search request through the first application, and the one or more candidate wireless access points providing to the second application comprises:
acquiring the one or more candidate wireless access points corresponding to the search request from the corresponding network device through the first application, and providing the one or more candidate wireless access points to the second application.

11. The method according to claim 10, wherein the acquiring the one or more candidate wireless access points corresponding to the search request through the first application, and providing the one or more candidate wireless access points to the second application comprises:
acquiring the one or more candidate wireless access points around the user equipment in a wireless scanning way through the first application based on the search request;
sending a candidate wireless access point acquirement request to the corresponding network device through the first application, wherein the candidate wireless access point acquirement request comprises at least one of the one or more scanning wireless access points;
acquiring the one or more candidate wireless access points returned from the network device, wherein the one or more wireless access points comprise the candidate wireless access point; and
providing the one or more candidate wireless access points to the second application through the first application.

12. The method according to claim 8, wherein the search request comprises information of application identification, information of search service identification and a service invocation name of the first application.

13. The method according to claim 12, wherein the search request comprises at least one of the following parameters:
a name of a wireless router;
a MAC address of the wireless router;
an encryption type of the wireless router; and
signal strength of the wireless router.

14. The method according to claim 12, wherein the search request further comprises the application-related information of the second application;
wherein the candidate wireless access point and application-related information of the second application are matched.

15. The method according to claim 12, wherein the search request is sent to the first application by the second application based on an inter-process communication mode.

16. A non-transitory computer-readable medium storing instructions, which when executed by one or more processors, cause an apparatus at least to:
acquire a connection request sent by a second application working in a user equipment, wherein a first application works in the user equipment; and
establish a wireless connection between the user equipment and a target wireless access point according to access information of the target wireless access point corresponding to the connection request through the first application;
when the access information of the target wireless access point corresponding to the connection request is pre-stored or pre-recorded in the user equipment, then when the connection request contains a determined target wireless access point, the access information of the target wireless access point is directly determined, and then the wireless connection is established; or when the connection request does not contain the determined target wireless access point, the target wireless access point is determined by the first application, and according to the access information of the target wireless access point, the wireless connection between the user equipment and the target wireless access point is established by the first application;
when the access information of the target wireless access point corresponding to the connection request is not pre-stored or pre-recorded in the user equipment, then based on the access information of the target wireless access point corresponding to the connection request acquired from a network device corresponding to the user equipment, the wireless connection between the user equipment and the target wireless access point is established by the first application.

17. An apparatus, comprising:
a memory; and
one or more processors executing instructions stored in the memory to cause the apparatus to:
acquire a connection request sent by a second application working in a user equipment, wherein a first application works in the user equipment; and
establish a wireless connection between the user equipment and a target wireless access point according to access information of the target wireless access point corresponding to the connection request through the first application;
when the access information of the target wireless access point corresponding to the connection request is pre-stored or pre-recorded in the user equipment, then when the connection request contains a determined target wireless access point, the access information of the target wireless access point is directly determined, and then the wireless connection is established; or when the connection request does not contain the determined target wireless access point, the target wireless access point is determined by the first application, and according to the access information of the target wireless access point, the wireless connection between the user equipment and the target wireless access point is established by the first application;
when the access information of the target wireless access point corresponding to the connection request is not pre-stored or pre-recorded in the user equipment, then based on the access information of the target wireless access point corresponding to the connection request acquired from a network device corresponding to the user equipment, the wireless connection between the user equipment and the target wireless access point is established by the first application.

18. The apparatus according to claim 17, wherein executive codes are not embedded and are not executed corresponding to a connection operation in the second application.

19. The apparatus according to claim 17, wherein codes of the first application are not provided in the second application to establish the wireless connection.

20. The apparatus according to claim 17, wherein the first application is an application developed by a service provider and the second application is an application that invokes a wireless connection service.

* * * * *